United States Patent [19]

Johnson

[11] 4,054,819
[45] Oct. 18, 1977

[54] MOTOR ANGULAR VELOCITY MONITOR CIRCUIT

[75] Inventor: Richard Severn Johnson, Bountiful, Utah

[73] Assignee: Sperry Rand Corporation, New York, N.Y.

[21] Appl. No.: 631,451

[22] Filed: Nov. 13, 1975

[51] Int. Cl.² ............................................. H02P 3/10
[52] U.S. Cl. .................................. 318/269; 318/449
[58] Field of Search .............. 318/257, 258, 261, 269, 318/449, 450, 461, 463–465, 599–601

[56] References Cited

U.S. PATENT DOCUMENTS

| 3,436,637 | 4/1969 | Ehret | 318/449 |
|---|---|---|---|
| 3,725,758 | 4/1973 | Loyk | 318/269 |
| 3,743,911 | 7/1973 | Erler | 318/599 |
| 3,764,885 | 10/1973 | Buxbaum et al. | 318/257 X |

Primary Examiner—Robert K. Schaefer
Assistant Examiner—W. E. Duncanson, Jr.
Attorney, Agent, or Firm—John R. Flanagan; Marshall M. Truex

[57] ABSTRACT

A circuit for controlling the operation of a bi-directional motor. A motor energized to run in one direction is stopped by applying a reverse or braking current to its energizing field. When the motor is virtually stopped, means are provided to de-energize the motor to prevent the motor from reversing direction.

12 Claims, 4 Drawing Figures

U.S. Patent     Oct. 18, 1977     4,054,819
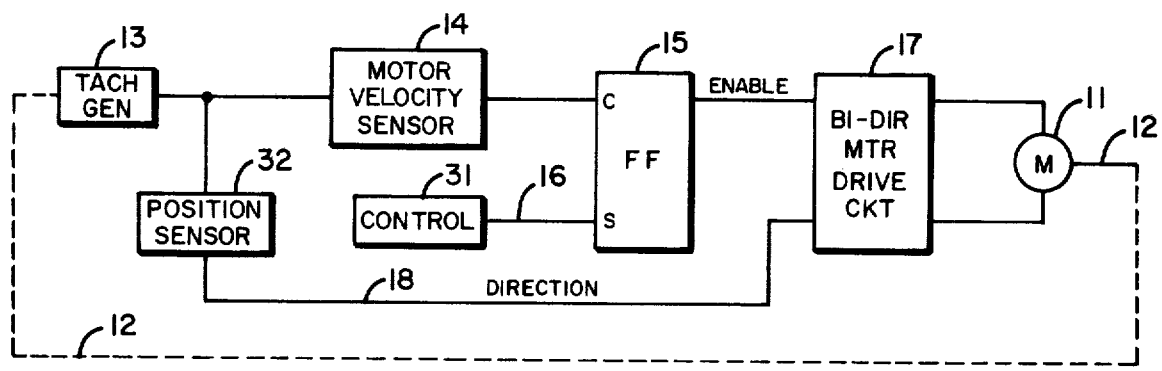
_Fig. 1_
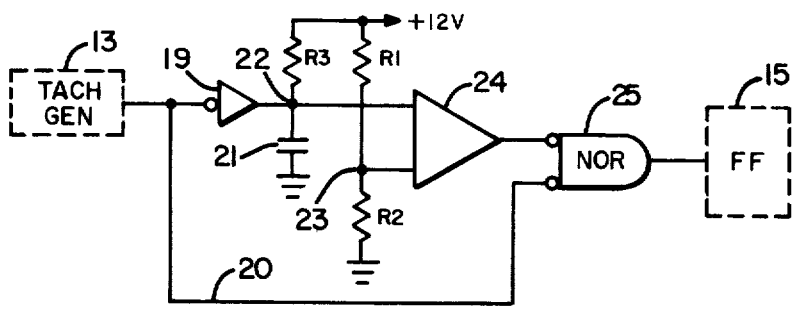
_Fig. 2_
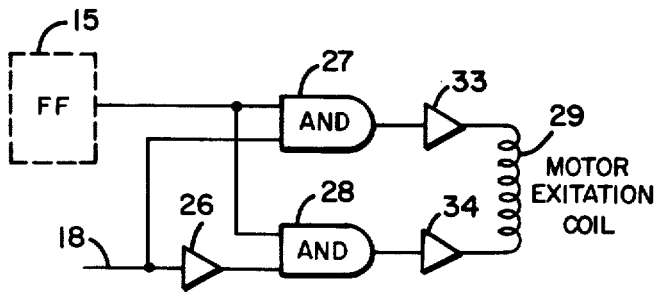
_Fig. 3_
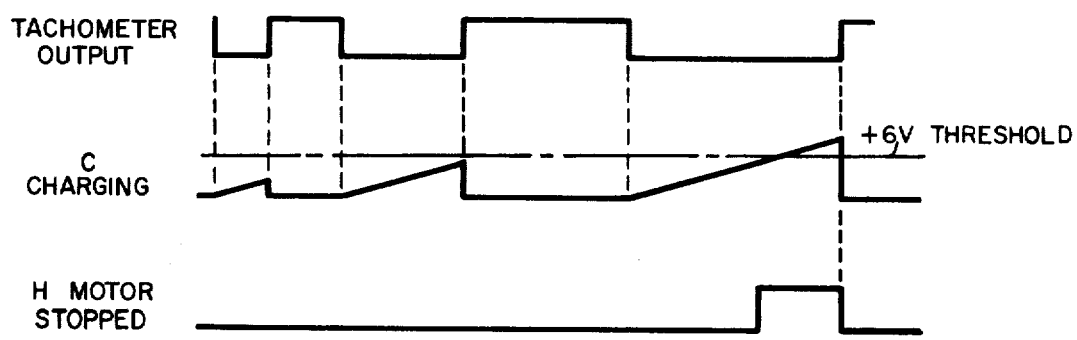
_Fig. 4_

MOTOR ANGULAR VELOCITY MONITOR CIRCUIT

BACKGROUND OF THE INVENTION

In a printer wherein a single motor is used to drive a carriage from left to right in the printing mode and from right to left during carriage return, some means must be provided for stopping the motor when the carriage has reached its end of print position during the print mode and its home position during carriage return.

To accomplish the foregoing highly complex electromechanisms have been used. These mechanisms have used one or more A.C. motors requiring sophisticated A.C. motor switching circuitry as well as complex gearing, clutch and cable arrangements.

The present invention contemplates a simple circuit and logic arrangement in conjunction with an inexpensive D.C. permanent magnet bi-directional motor which is capable of energizing the motor to run in either direction. When it is desired to stop the motor, logic circuit means are provided to apply a reverse or braking current to the motor. When the braking current has caused the motor to reach a virtual stop condition, further circuit means are provided to disable the motor without removing the condition which provides the braking current. This permits the braking current to be automatically applied as motor drive current when the circuitry again enables the motor.

OBJECTS

It is an object of the present invention to provide simple logic circuitry for controlling energization of a bi-directional motor in either direction.

Another object of the present invention is to provide circuitry for causing a reverse or braking current to be applied to the motor with means for disabling the motor when it has reached a virtual stopped condition.

A further object of the present invention is to provide current to cause a braking or reverse current to be applied to a motor and circuitry to disable the motor when it has reached a stop condition without eliminating the condition which set up the reverse current so that when the motor is re-enabled it automatically moves in the reverse direction.

Yet another object of the present invention is to provide a circuit for producing an output when the motor has reached a virtual stopped condition.

Other objects and many of the attendant advantages of the present invention will become apparent with reading the description in conjunction with the accompanying drawing.

DESCRIPTION OF THE DRAWINGS

FIG. 1 shows a block diagram incorporating the present invention;

FIG. 2 is a circuit showing the MOTOR VELOCITY SENSOR of FIG. 1 in more detail;

FIG. 3 is a circuit showing the BI-DIRECTIONAL MOTOR DRIVE CIRCUIT of FIG. 1 in more detail;

FIG. 4 is a timing chart useful in explaining the operation of the MOTOR VELOCITY SENSOR of FIG. 2.

DESCRIPTION OF THE INVENTION

Referring now to FIG. 1 there is shown a motor 11. The motor 11 is a D.C. permanent magnet motor of a type well known in the art. Its direction of rotation is determined by the polarity of current applied through its excitation field coil.

The output shaft of the motor 11 may be used to drive any load where bi-directional rotation is required. One example of such a load would be a printer carriage which must be moved back and forth across a print medium.

In addition the output shaft 12 is connected (shown by dotted lines) to a tachometer generator 13. The tachometer generator 13 provides as an output a predetermined number of pulses for each rotation of motor shaft 12. The tachometer generator may be of any conventional type. For example, it may comprise a disk having a plurality of slots around its periphery and means such as a light source and light sensor-pulse generator on opposite sides of the disk so that each time a slot passes between the light source and sensor a pulse is generated. The number of pulses generated for each rotation of shaft 12 would then depend on the number of slots in the disk. In the present invention the more pulses generated on each rotation of the shaft 12, the more accurate will be the functioning of the invention. However, it has been found that 20 to 30 pulses per rotation of shaft 12 provide sufficient accuracy for the purposes of the invention.

The output of tachometer generator 13 is connected to motor velocity sensor 14. In a manner to be discussed more fully with reference to FIG. 2, motor velocity sensor 14 provides an output pulse or high when motor 11 has reached a virtual stop condition or slightly prior in time to actual stop which may be of the order of a few ms. before actual dead stop.

The output terminal of motor velocity sensor 14 is connected to the clear or reset input of flip-flop 15. A terminal 16 is connected to the set input of flip-flop 15.

The output terminal of the flip-flop 15 is connected to an input terminal of a bi-directional motor drive circuit 17 to be described more fully in connection with FIG. 3. The motor drive circuit has a second input terminal 18.

The bi-directional motor drive circuit 17 has two output terminals; each is connected to one side of the excitation coil (not shown in FIG. 1) in the motor 11. As will be described more fully herein below, the bi-directional motor drive circuit 17 in response to its inputs will provide the motor 11 with a drive current which dependent on the input on terminal 18 causes the motor 11 to rotate in one or the other direction.

The input to the drive circuit 17 from the flip-flop 15 provides an enable pulse without which the motor 11 will remain or become disabled regardless of the input on the terminal 18. An enable pulse is provided the motor drive circuit 17 when the flip-flop 15 is in the "set" condition caused by a pulse or high on terminal 16. The flip-flop 15 is reset by a pulse or high from the motor velocity sensor 14 which in turn disables the motor 11 by removing the enable pulse from the bi-directional motor drive circuit 17.

Referring now to FIG. 2 which shows the motor velocity sensor 14 in more detail, the output terminal from the tachometer generator 13 is connected to an inverter 19 and directly to one input of a NOR circuit 25 via line 20.

The output terminal of the inverter 19 is connected to a voltage comparator 24 of conventional design. The voltage reference input terminal to voltage comparator 24 is connected at junction 23 of a voltage divider comprising resistors R1 and R2. The side of resistor R1 opposite the one connected to a +12V power supply is connected to the junction 23. The side of resistor R2 opposite the one connected to the junction 23 is connected to ground. This arrangement maintains the reference input to voltage comparator 24 at junction 23 at a voltage controlled by the ratio of the value of R1 and R2 and the value of +12V voltage. In a practical embodiment the resistance of each of resistors R1 and R2 is 10K ohms and the power supply is 12 volts. This set of values holds junction 23 at a constant 6 volts (within the tolerance of R1, R2 and the power supply).

The +12V power supply is also connected to one end of a resistor R3 the other end of which is connected to a junction 22. A capacitor 21 has one side connected to the junction 22 and its other side connected to ground. Since both R1 and R3 are connected to +12V the variations of +12V have no effect on the accuracy of the timing circuit.

The output of the tachometer generator 13 is essentially a square wave having highs and lows, the period of which varies in accordance with motor speed.

In operation, the circuit of FIG. 2 functions as follows. Each time the output of the tachometer generator 13 goes low, it is inverted by inverter 19 and provided as a positive voltage at junction 22. This causes the capacitor 21 to charge to a value dependent on the time the tachometer generator's output remains low (high at junction 22). The capacitor discharges during the time the tachometer generator's output is high (low at junction 22).

By appropriate selection of the parameters of the motor velocity circuit of FIG. 2, the NOR gate 25 may be used to provide an output pulse or high for any desired motor velocity. In the combination of the present invention the circuit of FIG. 2 is used to provide an output pulse or high when the motor 11 has reached a virtual stop condition.

Thus, as the motor 11 begins to slow down, as when braking occurs, the time that the output pulses of tachometer generator 13 remain low becomes longer and longer. This condition is shown in the time chart of FIG. 4 at the line labeled, "TACHOMETER OUTPUT."

During each such low (high at junction 22) the capacitor 21 charges. This charging cycle is shown in FIG. 4 at the line labeled, "C CHARGING." Note that during the time when the output of the tachometer generator 13 is high, the capacitor 21 rapidly discharges to ground so that each charging cycle begins at substantially ground potential.

At some point during slow down or braking of the motor 11, the capacitor 21 becomes charged to a potential above the constant threshold voltage at junction 23 or in a practical embodiment above the 6 volt threshold level which is seen in FIG. 4 where the charge ramp passes the line labeled, "THRESHOLD."

This condition causes the voltage comparator 24 to provide a low at the other input of the NOR gate 25 which, because it has in coincidence a low at its one input from the tachometer generator 13, provides a high as an output. Due to the chosen parameters of the present invention, this output is indicative of a motor stop or virtual stop condition. It should be noted that means other than NOR gate 25 may be used, e.g., an inverter could replace the NOR gate 25 which would eliminate the need for conductor 20.

This high output from the NOR gate 25 is provided as an input to the reset input of the flip-flop 15 to reset the flip-flop 15 thereby removing the enable signal to the bi-directional motor drive circuit 17 thereby disabling the motor 11.

For purposes of the present invention it is important to understand that the motor 11 is disabled at a time after a reverse or braking current has been applied to it. Without the circuit of FIG. 2 and the motor drive circuit 17, the braking or reverse current to the motor 11 would cause the motor 11 to reverse direction after it had come to a stop. With the circuit of FIG. 2 and the motor drive circuit 17, the motor is disabled before it has a chance to reverse direction. However, once the motor is re-enabled by an enable high from the flip-flop 15, the motor will automatically go in the opposite direction.

Such an arrangement is particularly useful where the load to be driven is of a reciprocating type, e.g., a printer carriage which is driven left to right in the print direction. At a predetermined point in its print travel, the motor driving the carriage is braked by a reverse excitation current; and when the motor is just about stopped, it is disabled to prevent it from causing a premature carriage return, e.g., before the print stylus has been moved away from the print medium and a print line advance has taken place. At the same time the motor already energized for a reverse rotation by the braking current automatically will reverse direction once it is again enabled by an enable pulse from the flip-flop 15 to cause a carriage return or similar movement.

A more thorough understanding of the present invention will be had by reference to FIG. 3 which is a more detailed depiction of the bi-directional motor drive circuit 17.

The bi-directional motor drive circuit 17 comprises AND gates 27 and 28. Each of the AND gates 27 and 28 has an output terminal connected via power amplifiers 33 and 34 to opposite ends of the excitation coil or winding 29 of the motor 11. It will be seen that a positive voltage or a high on the output terminal of the AND gate 27 causes the motor 11 to be driven in one direction, e.g., the forward direction while a positive voltage or a high on the output terminal of AND gate 28 causes the motor 11 to be driven in a second or reverse direction. If the motor 11 is being driven in the forward direction and the forward current excitation is replaced by a reverse current excitation, the motor is braked to a stop. If something isn't done to disable the motor at that time, the motor reverses direction.

Each of the AND gates 27 and 28 receives one of their inputs from the flip-flop 15 shown in dotted lines on FIG. 3.

Terminal 18 is connected to the second input terminal of the AND gate 27. Terminal 18 also provides the second input to the AND gate 28 via an inverter 26.

When the two input terminals to the AND gate 27 have a high, the output of the AND gate 27 will go high to drive the motor in a forward direction. This occurs only when there is a high on terminal 18 and a high output from the flip-flop 15.

When the two input terminals to the AND gate 28 have a high, there is a high on the output of the AND gate 28 and the motor is driven in the reverse direction. This occurs only when the output from the flip-flop 15 is high and there is a low on the terminal 18.

Thus, a high on the terminal 18 causes the motor to run in the forward direction as long as the output of the flip-flop 15 is high. Likewise, the motor 11 will run in the reverse direction when there is a low on terminal 18 as long as there is a high on the output of the flip-flop 15.

It can be seen, therefore, that when the motor 11 is rotating in the forward direction, the mere application of a low at terminal 18 will stop the excitation of the field in forward direction and immediately reverse the polarity of field excitation and be, in effect, a braking excitation which will slow and eventually stop the motor 11. Similarly, when the motor 11 is running in the reverse direction, a change from a low to a high on the terminal 18 will reverse the excitation of the coil 29 and cause the motor 11 to brake.

Whether the motor 11 is running forward, running forward and being braked, running reverse or running reverse and being braked, upon the removal of a high on the output terminal of the flip-flop 15, as by a reset pulse from the velocity sensor 14, the motor 11 becomes de-energized. When then a high appears on the output of the flip-flop 15 as by a set pulse being applied to the set terminal 16, the motor automatically energizes and goes in the forward or reverse direction depending on whether the terminal 18 has a high or low, respectively.

The terminals 16 and 18 may receive inputs in response to a variety of conditions for controlling the motor 11. In general terminal 16 is pulsed to reset the flip-flop 15 to enable the motor to respond to a high or low on terminal 18.

In a printer environment, for example, where the motor 11 is used to drive a carriage relative to a print medium, the flip-flop 15 is set when the printer is ready to print a line, and when after a line is printed, the carriage is to be returned to the home position and the flip-flop is reset to disable the motor 11 until the carriage is conditioned for return at which time the flip-flop 15 is set again. For the sake of completeness the means for applying pulses to set the flip-flop 15 is shown as a control 31 which would be condition responsive to set the flip-flop 15 when the printer was ready to print or return to home position.

In addition a box labeled position sensor 32 is shown. This position sensor will cause a high to be provided on terminal 18 when a printer carriage is in the home position to cause the motor to energize in the forward direction. When the carriage has reached a predetermined point in its printing movement, the position sensor will apply a low on terminal 18 applying a braking current. Conversely, when the carriage has finished a line of print and the carriage reverses due to a high from flip-flop 15 enabling the motor again (the low remaining on terminal 18), the position sensor 32 will at a predetermined point in the travel of the carriage to the home position cause a high on terminal 18 to apply a braking current to the motor 11. When the carriage has reached a virtually stopped position at home, the motor velocity sensor will provide a pulse to reset the flip-flop 15 which disables the motor to prevent immediate movement of the carriage in the print direction.

As previously explained after the braking current has been applied to the motor 11 and it is in a virtual stop condition, i.e., a few more milliseconds and it would be absolutely stopped, the motor velocity sensor 14 will reset the flip-flop to automatically disable the motor 11 via the bi-directional motor drive circuit 17.

Other modifications of the present invention are possible in the light of the above description and the illustration of the present invention set forth should not be construed as placing limitations on the present invention other than those limitations contained in the claims which follow.

What is claimed is:

1. A circuit for controlling the operation of a bi-directional motor having an excitation winding, comprising in combination;
   a motor drive circuit electrically connected to the motor,
   said motor drive circuit having first and second input terminals and including logic circuit means for energizing the motor in a first rotational direction only when said first and second input terminals have coincident highs and in a second rotational direction only when said first input terminal has a high coincident with a low on said second input terminal,
   control means connected to said first terminal for removing the high therefrom to de-energize the motor when its speed reaches a predetermined amount.

2. A control circuit according to claim 1 wherein said control means comprises,
   a flip-flop having its output connected to said first input terminal and having set and reset terminals,
   a motor velocity sensing circuit means connected to said reset terminal for providing a reset pulse thereto when the speed of the motor reaches a predetermined amount whereby a low appears on said first input terminal de-energizing the motor.

3. A control circuit according to claim 2 wherein said motor velocity sensor means comprises,
   a motor velocity sensor,
   a tachometer generator connected between the shaft of the motor and said motor velocity sensor providing input pulses to said motor velocity sensor representative of the speed of the motor.

4. A control circuit according to claim 3 wherein said logic circuit means comprises,
   first and second AND gates,
   said first input terminal connected to said first and second AND gates,
   said second input terminal connected to said first AND gate,
   inverter means connecting said second input terminal to said second AND gate,
   amplifier means connecting the outputs of said first and second AND gates to opposite sides of the motor winding.

5. A control circuit according to claim 4 wherein said motor velocity sensor comprises,
   a NOR gate having its output connected to said reset terminal of said flip-flop,
   first means directly connecting the output of said tachometer generator as one input to said NOR gate,
   second means connecting the output of said tachometer generator as a second input to said NOR gate,
   said second means providing a low to said second input of said NOR gate when a pulse from said tachometer generator is low for a predetermined time.

6. A control circuit according to claim 5 wherein said second means comprises,
   a voltage comparator having a reference input terminal and a variable input terminal,
   said voltage comparator providing a low output to said second input of said NOR gate when the amplitude of said variable input exceeds the amplitude of said reference input, voltage divider means for maintaining said reference input terminal at a predetermined value, timing circuit means providing inputs to said reference input terminal having amplitudes representative of the times the output of said tachometer generator is low.

7. A control circuit according to claim 6 wherein said timing circuit means comprises, a capacitor having one side connected to ground, a D.C. power supply, a resistance connected between said power supply and the other side of said capacitor, an inverter connected between said tachometer generator and the junction of said resistance and said capacitor.

8. A motor velocity sensor for providing an output pulse when the speed of a motor reaches a predetermined level, comprising in combination, a tachometer generator connected to the output shaft of the motor and providing output pulses whose length of duration are indicative of motor speed, a gate providing an output pulse in response to two coincident input pulses, first means connecting the output of said tachometer as one input to said gate, a voltage comparator having a reference voltage input terminal and a variable voltage input terminal providing a low as an output when the voltage on the variable voltage input terminal exceeds the voltage on said reference voltage input terminal, second means connecting the output of said voltage comparator as the second input to said gate, and circuit means connected between said tachometer generator and said variable voltage input terminal of said voltage comparator for providing an output whose amplitude is proportional to the speed of the motor whereby said gate provides an output whenever the speed of the motor reaches the predetermined level, said circuit means comprising a capacitor having one side connected to ground, a DC power supply, a resistance connected between said power supply and the other side of said capacitor, and second means connecting the output of said tachometer generator to the junction of said resistance and said capacitor, said junction being connected to said variable voltage input terminal of said voltage comparator.

9. A motor velocity sensor according to claim 8 wherein said gate is a NOR gate and said second means is an inverter whereby each negative going pulse from said tachometer generator charges said capacitor to a positive value proportional to the time of duration of the negative going pulse.

10. A control circuit according to claim 4 wherein said motor velocity sensor comprises, an inverter having its output connected to said reset terminal of said flip-flop, circuit means connecting the output of said tachometer generator to said inverter, said circuit means providing a low to said inverter when a pulse from said tachometer generator is low for a predetermined time.

11. A control circuit according to claim 10 wherein said circuit means comprises, a voltage comparator having a reference input terminal and a variable input terminal, said voltage comparator providing a low output to said inverter when the amplitude of said variable input exceeds the amplitude of said reference input, voltage divider means for maintaining said reference input terminal at a predetermined value, timing circuit means providing inputs to said reference input terminal having amplitudes representative of the times the output of said tachometer generator is low.

12. A control circuit according to claim 11 wherein said timing circuit means comprises, a capacitor having one side connected to ground, a D.C. power supply, a resistance connected between said power supply and the other side of said capacitor, an inverter connected between said tachometer generator and the junction of said resistance and said capacitor.

* * * * *